UNITED STATES PATENT OFFICE.

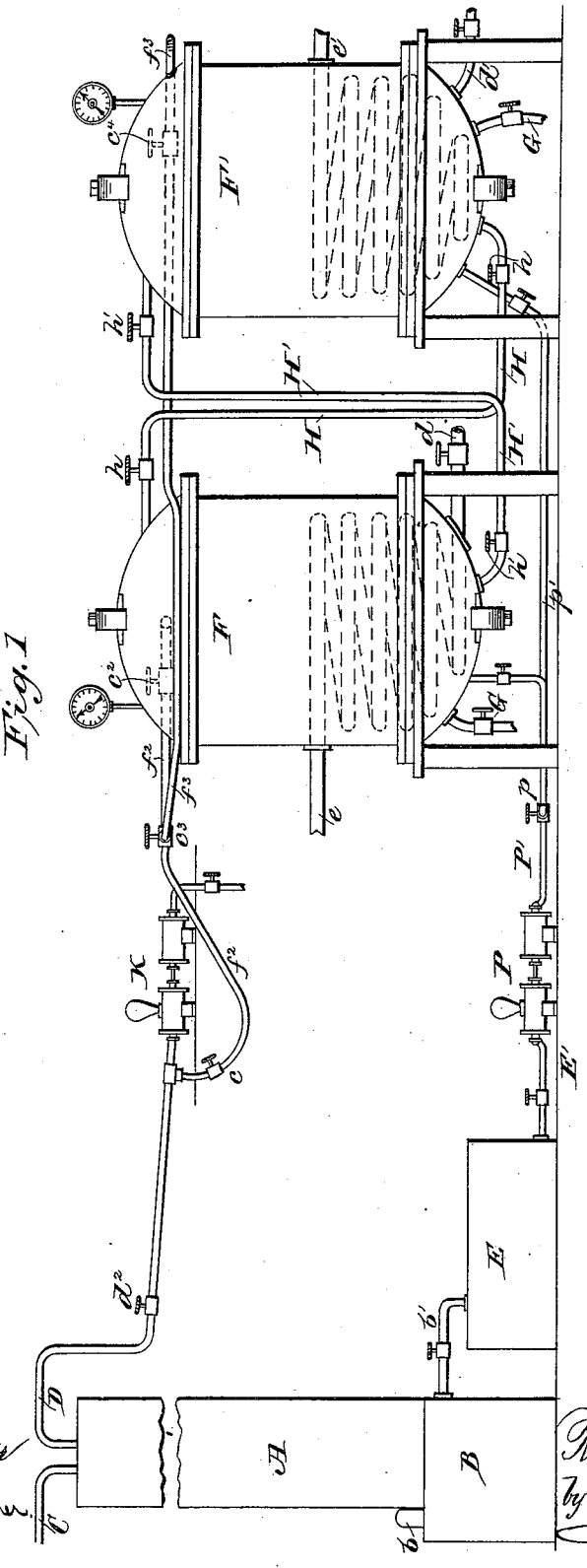

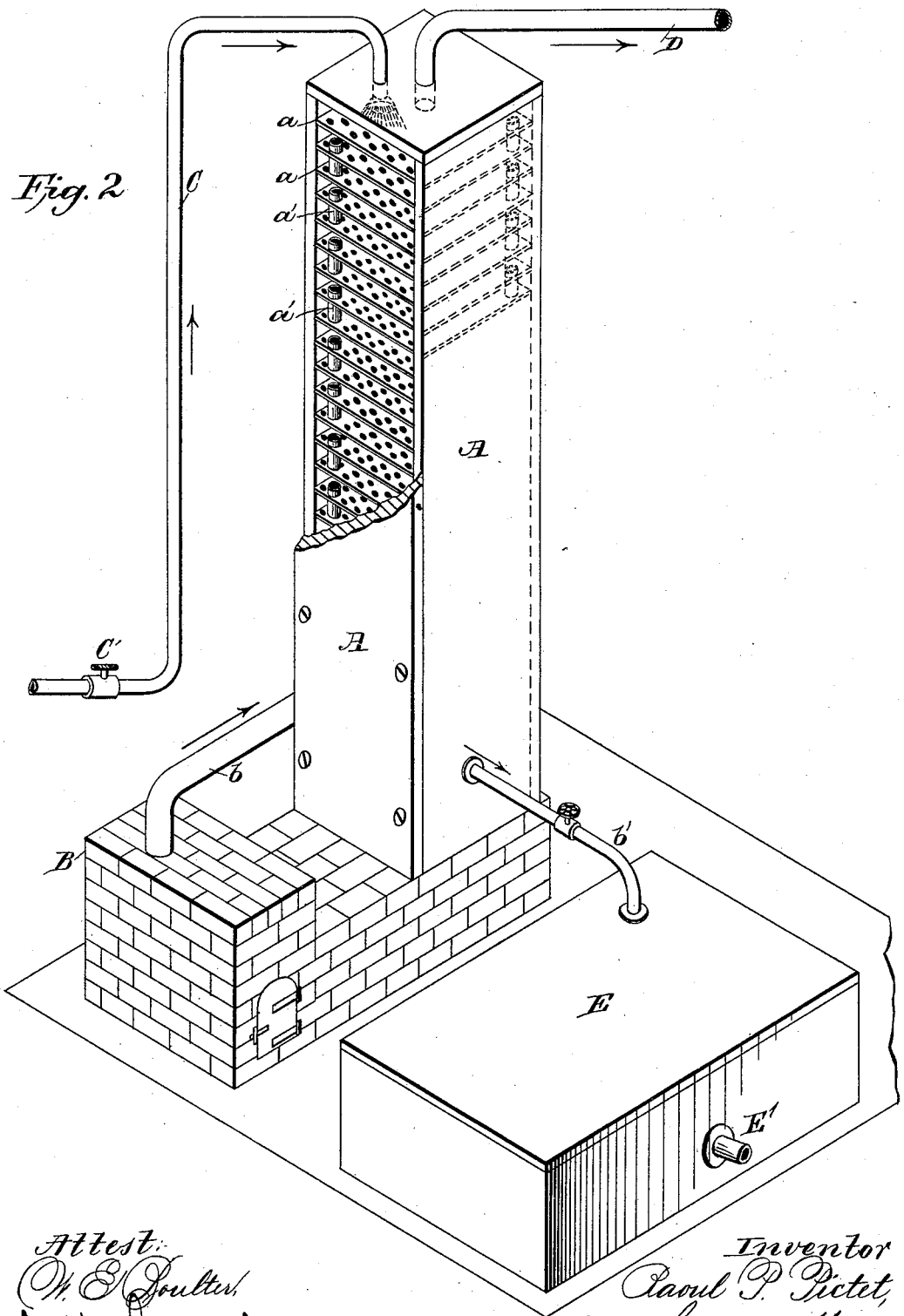

RAOUL PIERRE PICTET, OF GENEVA, ASSIGNOR OF ONE-HALF TO GEORGE L. BRELAZ, OF LAUSANNE, SWITZERLAND.

PROCESS OF DISINTEGRATING FIBROUS MATERIALS.

SPECIFICATION forming part of Letters Patent No. 404,431, dated June 4, 1889.

Application filed August 19, 1887. Serial No. 247,371. (No model.) Patented in France April 6, 1887, No. 182,693; in Belgium April 7, 1887, No. 77,003; in England April 9, 1887, No. 5,269; in Sweden April 13, 1887, No. 1,222; in Germany April 15, 1887, No. 41,703; in Norway April 20, 1887, No. 523, and in Austria-Hungary December 24, 1887, No. 31,579, and No. 60,831.

*To all whom it may concern:*

Be it known that I, RAOUL PIERRE PICTET, a citizen of Switzerland, residing at Geneva, Switzerland, have invented certain new and useful Improvements in the Process of Disintegrating Fibrous Materials, (for which I have obtained Letters Patent in the following countries: France, April 6, 1887, No. 182,693; Belgium, April 7, 1887, No. 77,003; England, April 9, 1887, No. 5,269; Germany, April 15, 1887, No. 41,703; Austria-Hungary, December 24, 1887, No. 31,579 and No. 60,831; Norway, April 20, 1887, No. 523; Sweden, April 13, 1887, No. 1,222;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 shows by a schematic elevation my improved wood-pulping plant. Fig. 2 is an isometric view of the sulphurous-acid generator, a portion of one of the walls of the tower being broken away to show the arrangement of the perforated shelving.

The invention relates to the disintegration of fibrous materials, more especially wood, for its conversion into paper-stock; and it has for its object the economical, rapid, and complete disintegration of the wood by means of sulphurous acid.

The invention consists in a novel process of disintegration, substantially as hereinafter fully described, and as set forth in the claims.

In Letters Patent of the United States granted to myself and George Louis Brelaz, under date of December 1, 1885, No. 331,323, I have described a process of disintegration by digesting the wood in a sursaturated solution of sulphurous acid at a temperature not exceeding 100° centigrade, and have therein fully set forth the reasons why such low temperature, as compared with the temperatures at which the operations of disintegration had been carried on, is preferred.

I have found that perfect disintegration can be attained even at lower temperatures, and that the disintegration proceeds with greater rapidity and is more perfect when a very weak solution of sulphurous acid is employed to start with, the strength of the solution being gradually increased until sursaturation is reached.

I have further found that the operation of disintegration may be commenced with a cold—*i. e.*, a solution of normal temperature—and of a strength not exceeding 1° Baumé, and that the process of disintegration goes on more uniformly when the temperature of the solution is gradually raised to the temperature required.

The temperature necessary to the perfect disintegration being very low as compared with the temperature usually thought necessary, I am enabled to dispense with the direct application of heat to the digester, in which the disintegration is effected as is usually the case, either by direct firing or injecting steam into the digester or passing steam through a heater-coil. I supply the required heat through the medium of the sulphurous-acid gas evolved from a solution of such and admitted to the digester to gradually increase the temperature of the cold and weak solution therein, and to gradually increase the strength of the solution until sursaturation has been reached, as will hereinafter appear. Finally, I prefer, although it is not absolutely necessary, to conduct the operation in a partial vacuum, for purposes fully set forth in the Letters Patent hereinbefore referred to.

The process may be carried out in any desired manner and by any desired means, provision being made for raising the strength of the sulphurous-acid solution to sursaturation.

In the accompanying drawings I have shown a convenient apparatus or plant for carrying out my invention, which I will now describe.

B indicates the masonry-work, in which is the furnace for burning sulphur or pyrites, and which supports a column A. The column consists of a wooden box rectangular in cross-section, which may or may not be lined with lead, and is made sufficiently tight, so as to admit of producing a slight vacuum therein. Within the column are arranged perforated shelves $a$, the perforations of which are comparatively small, and each alternate shelf is provided with an overflow-pipe $a'$, as is common in rectifying-columns. The column is connected below the lower shelf with the furnace by means of a pipe $b$, to conduct the sulphur-vapors into said column, and by a pipe $b'$ with a reservoir E, to conduct the sulphurous-acid solution thereto. At its upper end the column A is connected by a pipe C with a source of water-supply, and by a pipe D with any suitable exhauster.

The reservoir E is connected by means of a pipe $E'$ with a pump P or other forcing device, and said pump is connected by a pipe $P'$, having branches $p\ p'$, with two digesters F and $F'$, respectively.

The digesters are of well-known construction, and are provided with any suitable means for heating the same. In the drawings I have shown in dotted lines a coil of pipe $f\ f'$, respectively, the steam being admitted to the coils $f$ and $f'$ by pipes $d$ and $d'$ and exhausted therefrom by pipes $e$ and $e'$, respectively, or vice versa. Each digester is provided with a waste-pipe G, a charging and discharging orifice at top and bottom, respectively, closed tightly by suitable covers, and with a manometer.

The two digesters are connected together by means of pipes H H', extending from the top of one of the digesters to the bottom of the other, so that the sulphurous-acid gases from digester H may be conducted from the upper end thereof to the bottom of digester H', and vice versa.

The pipes C D, as well as all the steam, connecting, and waste pipes, are provided with suitable valves or stop-cocks, as shown and for purposes well understood.

I have hereinabove stated that I prefer to operate with a partial vacuum. To this end the two digesters may be connected with the exhauster K, for producing a partial vacuum in the tower A, and the digesters may be so connected with the exhauster that such partial vacuum may be produced in either of said digesters. To this end the digester F is connected with the suction-pipe of the exhauster K by a valved pipe $f^2$ and the digester F' to the pipe $f^2$ by a branch pipe $f^3$, so that by closing the stop-cock $d^2$ in pipe D and opening the stop-cocks $c\ c^2$ in pipe $f^2$ (the stop-cocks $c^3\ c^4$ in pipe $f^3$ being closed) a partial vacuum may be formed in digester F. On the other hand, by closing the stop-cock $c^2$ in pipe $f^2$ and opening the stop-cocks $c^3 c^4$ in pipe $f^3$ a like partial vacuum may be formed in digester F' before the operation of disintegration is commenced and after one of said digesters is charged with the wood to be disintegrated.

The operation of producing the sulphurous acid and of converting the wood into pulp or cellulose is carried out as follows: The furnace of the sulphurous-acid apparatus is of well-known construction and of such a capacity to burn the required quantity of sulphur or pyrites within a given time, the products of the combustion consisting of sulphurous acid and nitrogen, the latter being in greater proportion when pyrites are used, as is well known. These vapors are drawn into the column A by the exhauster K, and water being sprayed into the upper end of the column the sulphurous-acid vapors are absorbed and the nitrogen is exhausted into the air. The volume of water admitted is regulated by means of the stop-cock $C'$ in pipe C, so as to supply from eighty to one hundred kilograms of water for each kilogram of sulphur consumed. As the water descends, it is more and more charged with sulphurous acid, so that none of this gas will reach the exhaust-pipe, a maximum absorption being thus attained. In view of the relative proportion of water and sulphurous acid the solution collected at the bottom of the column is a weak one, not exceeding 1° Baumé, so that the losses of sulphurous acid are inappreciable, said solution being far from saturation at normal temperatures.

The exhauster may be dispensed with so far as its operation with regard to the sulphurous-acid apparatus is concerned. I prefer, however, to use an exhauster for various reasons, first, to secure a more uniform flow of the gases through the column; secondly, to prevent any sulphurous-acid gas that may reach the top of the column from escaping into the atmosphere, as by means of an exhauster such gases may be forced into a bath of milk of lime and absorbed thereby to destroy their deleterious effects.

The degree of vacuum in the column A is simply to be calculated by the sum of the depth of the water on the perforated shelves, of which the column may have thirty-six, for instance, which in this case would be equal to about seventy-five centimeters of water, representing a very feeble vacuum not exceeding one-tenth of an atmosphere. As above stated, the shelves are perforated, the perforations being, however, small, so as not to admit of a free flow of the water through such perforations, such flow being further resisted by the ascending gases and the action of the exhaust-pump, so that there is always a stratum of water on said shelves, the excess flowing over through the overflow-pipes. Under these conditions it will readily be understood that no sulphurous-acid gas will reach the exhaust-pipe, so that the nitrogen may be safely allowed to escape into the atmosphere; but should traces of sulphurous acid be detected the exhausted gases are then disposed of as above described. I am also enabled under the conditions of the operation referred to to construct the column of wood, the perforated diaphragms or partitions being simply laid on cleats, one of the walls of the column being made detachable.

To avoid any access of air to or escape of gases from the column any suitable means may be employed to make the column tight—as, for instance, it may be inclosed in a sheet or jacket of lead, the feeble vacuum within the column insuring tightness at the joints.

Instead of exhausting the vapors or gases they may be forced out of the column. In this case the furnace will preferably be inclosed in a tight sheet-metal casing capable of resisting at the outside a pressure of about one meter of water. A compressor or forcing device of any desired construction is used in this case to force air into the furnace to support combustion, the products of combustion escaping into the tower under their own pressure. In this case the column should be of sufficient strength to resist the pressure. In either case the furnace is supplied with sulphur or pyrites from time to time. The sulphurous-acid solution of a strength of from 1° to 2° Baumé is collected in the reservoir E; or a plurality of such reservoirs may be used, said reservoirs being constructed of wood and lined with a thin sheet of lead. When a sufficient quantity of the solution has been produced, one of the digesters—say the digester F—is charged with wood reduced to a suitable size, a partial vacuum is produced therein, and the pump P is set in operation. The stop-cocks $h$ in the connecting-pipe H, that connects said digester with the digester F' and the waste-pipe cocks in both digesters, have been previously closed, while the stop-cocks $h'$ in the connecting-pipe H', that connects the digester F' with the digester F, have been opened. The solution from reservoir E is now forced into digester F until the charge therein is covered thereby, when the communication between the pump and digester F is cut off and communication is established between the pump and digester F', and the latter is nearly filled with the solution. Steam is now admitted to the coil in digester F' to sufficiently heat the solution to vaporize or set the sulphurous-acid gas free. The liberated gas under its own pressure is forced into digester F to gradually increase the strength of the solution therein, and also gradually increase the temperature of said solution, as it is obvious that the gases enter the digester F at gradually-increasing temperatures, the wood being as gradually impregnated with sulphurous acid. When the charge of solution in digester F' is deprived of its sulphurous-acid gas, it is allowed to run out through the waste-pipe, and a fresh charge is pumped into it. This is repeated, if necessary, until the solution in digester F has become sursaturated, at which point it is maintained until the wood therein is completely disintegrated. When this has taken place, the communication between the pump P and the digester F' and the communication between the two digesters through pipe H' is cut off. The solution, deprived of its gases in digester F', is allowed to run out, after which said digester is charged with wood, a partial vacuum is formed therein, and it is then charged with the weak solution from reservoir E. The stop-cocks in pipe H are now opened, and steam is admitted to the coil in digester F, the steam from the coil in digester F' having previously been cut off. The sulphurous-acid gas from the solution in the digester F is now evolved under the action of heat, and passes into the digester F', where it is absorbed by the solution therein, and when said solution in digester F has been freed from its sulphurous-acid gas the contents of the digester are removed, and said digester is placed in communication with the pump and charged with a weak solution from the reservoir from which the sulphurous-acid gas is eliminated and admitted to digester F', or so much of said gas as will be necessary to make up for losses, and until the charge of solution in digester F' is sursaturated and the wood therein disintegrated or converted into pulp, when the operation described is again reversed, the digester F being again charged with wood, and so on. The degree to which the gases are heated is such as not to exceed 100° centigrade at any time.

The continuous operation of the sulphurous-acid apparatus will necessarily depend on its capacity relatively to the capacity of the digesters and that of the reservoir E, and the relative capacity of said elements may be so calculated as to require a continuous operation of the sulphurous-acid apparatus.

It will be seen that the operation of producing the sulphurous acid and the operation of disintegration are carried out simultaneously and that the losses in sulphurous acid are reduced to a minimum, the gases being used over and over again, the loss being only such as may be due to incomplete elimination from the solution or unavoidable leakage, yet if the digesters are carefully constructed and the process of recuperation carried out with any care at all there is practically no loss in sulphurous-acid gas and no infectious effect due to escape of such gases. By exhausting the air from the wood-charged digester, and thus forming a partial vacuum therein before admitting the weak solution thereto, the heating of said solution is materially facilitated and the vaporization after sursaturation promoted. There is a further advantage in that the pores of the wood are opened and the disintegration proceeds more rapidly than otherwise, as fully described in the patent hereinabove referred to. It will also be observed that the plant is a very simple one, and that a material saving in labor is effected.

Having described my invention, what I claim is—

1. The herein-described process in the production of cellulose, which consists in immersing the fibrous material in a solution of sulphurous acid of normal temperature and of a strength of about 1° Baumé, gradually increasing the strength of the solution to sursaturation and gradually increasing the temperature thereof to about 100° centigrade by passing heated sulphurous-acid vapors into said solution, substantially as and for the purposes specified.

2. The herein-described process in the production of cellulose, which consists in immersing the fibrous material in a solution of sulphurous acid of normal temperature and of a strength of about 1° Baumé, in a partial vacuum, gradually increasing the strength of the solution to sursaturation, and gradually increasing the temperature thereof to about 100° centigrade by passing heated sulphurous acid vapors into said solution, substantially as and for the purposes specified.

In testimony whereof I affix my signature in presence of two witnesses.

RAOUL PIERRE PICTET.

Witnesses:
  M. TANWERZ,
  ROBT. M. HOOPER.